United States Patent
Cataldo

[15] 3,657,902
[45] Apr. 25, 1972

[54] SHAFT COUPLING
[72] Inventor: Roy S. Cataldo, Birmingham, Mich.
[73] Assignee: General Motors Corporation, Detroit, Mich.
[22] Filed: Dec. 7, 1970
[21] Appl. No.: 95,467

[52] U.S. Cl............................................64/13, 64/27 NM
[51] Int. Cl................................................F16d 3/12
[58] Field of Search...................................64/13, 11, 27 NM

[56] References Cited

UNITED STATES PATENTS

| | | | |
|---|---|---|---|
| 2,873,590 | 2/1959 | Croset | 64/14 |
| 2,989,857 | 6/1961 | Helland et al. | 64/27 X |
| 3,525,238 | 8/1970 | Cruz | 64/27 X |
| 3,500,659 | 3/1970 | Martin | 64/27 X |

*Primary Examiner*—Kenneth W. Sprague
*Attorney*—W. E. Finken and D. L. Ellis

[57] ABSTRACT

A shaft coupling between first and second shafts, the shaft coupling including a resilient member of low torsional spring rate connecting the shafts, a pair of surface elements rotatable as a unit with respective ones of the shafts, and a plurality of elastically deformable spheres disposed in substantial compression between the surface elements and generating resistance to rolling movement so as to retard relative angular movement between the surface elements, the resistance to rolling movement torsionally damping the resilient member to eliminate looseness or sponginess between the shafts.

3 Claims, 11 Drawing Figures

PATENTED APR 25 1972

INVENTOR.
Roy S. Cataldo

BY
D. L. Ellis
ATTORNEY

PATENTED APR 25 1972

INVENTOR.
Roy S. Cataldo
BY
D. L. Ellis
ATTORNEY

SHAFT COUPLING

This invention relates generally to shaft couplings and in particular to a torsionally damped flexible shaft coupling.

In the design of automotive steering systems it is a well known practice to provide a flexible coupling between the steering shaft which has the steering wheel connected thereto and the input shaft of the steering gear to accommodate minor misalignment between the steering and the input shafts. It is also known that the handling characteristics of an automobile under certain conditions, such as when the vehicle encounters a cross wind gust, can be favorably affected by introducing between the steering shaft and steering gear input shaft a low rate torsional spring which allows a predetermined amount of understeer. Prior art flexible couplings, while inherently exhibiting some torsional resilience, purposely do not provide a sufficiently low spring rate to effect optimum handling improvement because such a low rate necessarily introduces an intolerable degree of sponginess or looseness in the steering system which sponginess is sensed by the operator at the steering wheel. A shaft coupling according to this invention represents a successful reduction to practice of a simple and compact coupling means wherein a low rate torsional spring transmits torque between a steering shaft and a steering gear input shaft and is torsionally damped to avoid sponginess.

The primary feature of this invention is that it provides a new and improved shaft coupling, particularly adapted for use in a vehicle steering system, which couples a first shaft to a second shaft through a low rate torsionally resilient medium without the sponginess or looseness which normally characterizes such connections. Another feature of this invention is that it provides a shaft coupling wherein the resilient medium is elastically angularly deformable in response to the application of torque to the first shaft and wherein a torsional damping medium is operable to viscously damp the resilient medium by retarding relative angular movement between the shafts. Still another feature of this invention resides in the provision in such a coupling of a damping medium including a rolling element and a surface element, one of which elements is elastically deformable, and means for compressing the rolling element against the surface element, the compression causing elastic deformation of the one element and the deformation resulting in resistance to rolling movement of the rolling element which rolling resistance, in turn, effect viscous torsional damping of the resilient medium. A still further feature of this invention resides in the provision of a torsional damping medium including a pair of relatively axially movable surface elements on respective ones of the first and second shafts and a plurality of rubber sphere rolling elements mounted between the surface elements, relative axial movement between the surface elements compressing the rubber spheres and the compression generating resistance to rolling of the rubber spheres over the surface elements which rolling resistance effects viscous torsional damping of the resilient medium.

These and other features of this invention will be readily apparent from the following specification and from the drawings wherein.

Figure 1:
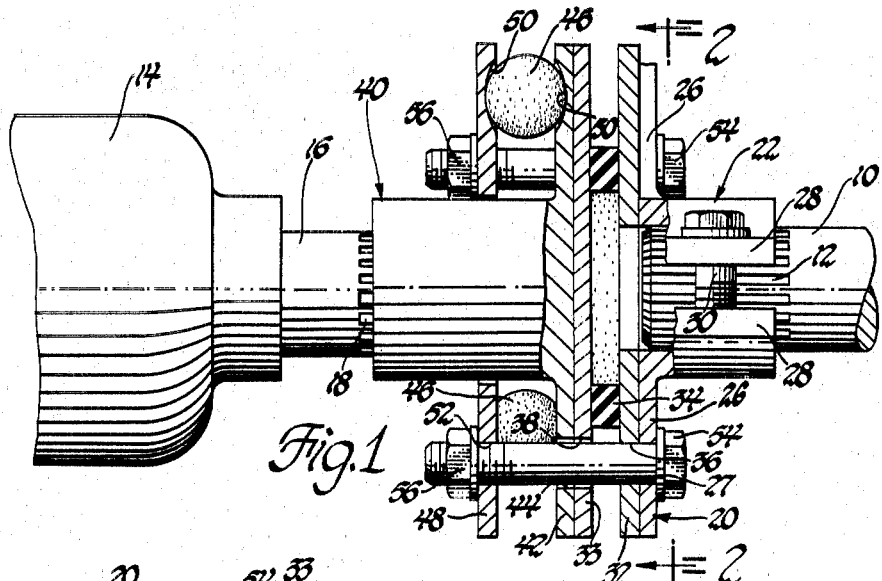
FIG. 1 is a fragmentary partially broken away side elevational view of a vehicle steering system including a shaft coupling according to this invention.

Referring generally now to the drawings in which like numerals indicate like parts throughout the several views and in particular to FIG. 1, a portion of an automotive type steering system is there shown and includes a steering shaft 10 rotatably supported by antifriction bearing means, not shown, on the vehicle body and having a plurality of axial splines 12 at one end thereof and a conventional steering wheel, not shown, attached to the other end thereof for unitary rotation therewith, the steering shaft 10 being enclosed in a steering column mast jacket, not shown, which may or may not be of the energy dissipating collapsible type. The steering system further includes a steering gear assembly 14 of the manual or power assist type rigidly attached to the frame of the vehicle, not shown, the steering gear assembly including an input shaft 16 having a plurality of axial splines 18 at one end thereof. The steering shaft 10 is connected to the input shaft 16 by a shaft coupling according to this invention and designated generally 20.

Figure 2:
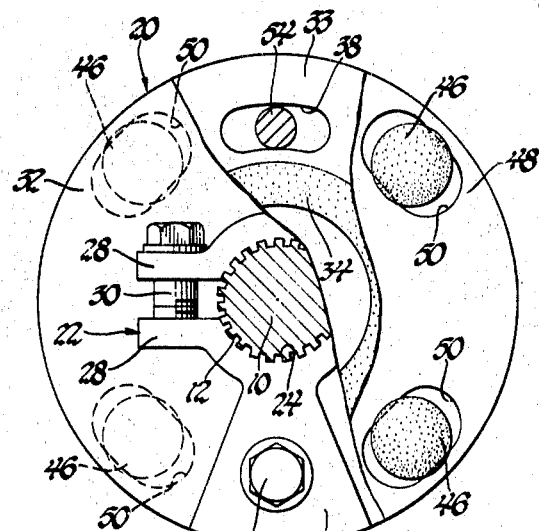
FIG. 2 is a partially broken away sectional view taken generally along the plane indicated by lines 2—2 in FIG. 1.
Figure 3:
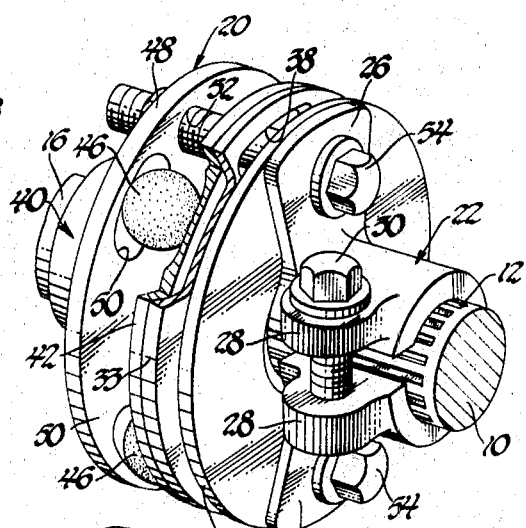
FIG. 3 is a partially broken away perspective view of the shaft coupling shown in FIGS. 1 and 2.

As seen best in FIGS. 1, 2 and 3, the shaft coupling 20 includes a split collar 22 having a plurality of internal splines 24, a pair of perpendicular flanges 26 including diametrically opposed apertures 27 and a pair of lugs 28. The internal splines 24 slidably engage splines 12 on the steering shaft and a bolt 30 connecting the lugs 28 is operative to lock the split collar 22 against axial movement on the input shaft with the flanges 26 aligned generally with the end of the shaft.

The shaft coupling 20 further includes a resilient connecting medium, the connecting medium including a pair of spaced circular plate members 32 and 33 interconnected by a resilient annular member 34. The annular member 34 may be fabricated from any type of resilient material and connected to the plate members 32 and 33 in any known manner but is preferably fabricated from relatively soft rubber which may be easily bonded to the plate members. The soft rubber functions as a relatively low rate torsional spring capable of transmitting power between the plate members 32 and 33 while permitting relative angular movement therebetween. The plate member 32 includes a pair of diametrically opposed apertures 36 and the plate member 33 includes a pair of diametrically opposed arcuate slots 38 generally aligned with respective ones of the apertures 36 in the plate member 32.

As best seen in FIG. 1, a second split collar 40 having a plurality of internal splines, not shown, engageable on splines 18 on shaft 16 is rigidly clamped on the end of shaft 16 by means similar to bolted lugs 28 on the split collar 22. The split collar 40 includes a circular flange 42 having a pair of diametrically opposed arcuate slots 44 therein, the flange 42 defining a first surface element of the shaft coupling. The plate member 32 is rigidly attached, as by welding, to flanges 26 on the split collar 22 with apertures 36 in the former in register with apertures 27 in the latter and the plate member 33 is similarly rigidly attached to circular flange 42 on split collar 40 with slots 44 in the former in register with slots 38 in the latter. With the split collars 22 and 40 clamped, respectively, to the steering shaft 10 and the input shaft 16, the resilient annular member 34 functions as a low rate torsional spring elastically deformable in response to a torque differential between the shafts and also limitedly deformable to accommodate minor misalignments between the shafts.

The shaft coupling 20 further includes a damping medium operative as described hereinafter to torsionally damp the resilient medium, the damping medium including a plurality of elastically deformable rolling elements in the form of rubber spheres 46 which may, of course, be fabricated from other resilient materials as desired. The rolling elements are captured between the surface element defined by circular flange 42 and another surface element defined by an annular retainer 48 surrounding the split collar 40. Each of the circular flange 42 and annular retainer 48 include a plurality of arcuate seats 50 in opposing surfaces thereof in which seats are received respective ones of the spheres 46. The annular retainer 48 also includes a pair of diametrically opposed apertures 52 which, when opposing seats 50 in the retainer and circular flange are aligned, register with slots 44 and 38 and apertures 36 and 27, respectively, in the circular flange 42, plate members 33 and 32, and the flanges 26 on split collar 22. A pair of long shank bolts 54 are received through the apertures 27, 36 and 52 and pass through the arcuate slots 38 and 44, the end of each bolt projecting beyond annular retainer 48. A pair of nuts 56 are threadedly received on the ends of respective ones of the bolts 54 and function to restrain axial movement of the retainer 48 relative to the circular flange 42 and to maintain the spheres 46 in their respective seats 50. The bolts 54, relatively closely received in apertures 27 and 36 in flanges 26 and plate member 32, function as rigid links coupling the retainer 48 to the split collar 22 for unitary rotary movement with the steering shaft. The bolts 54 also provide mechanical coupling means between the split collar 22 and the split collar 40 through slots 44 in flange 42 to maintain positive a connection between the steering shaft 10 and the input shaft 16 in the event that resilient member 34 fails.

Referring now to FIG. 1 and assuming that the nuts 56 are tightened only enough to just maintain the spheres 46 in respective ones of the seats 50 without any significant compression thereof, a torque or turning moment applied to the steering wheel, as might be applied by an operator maintaining the vehicle in normal straight line movement, is transferred directly to the steering shaft. Torque on the steering shaft necessarily torsionally stresses the resilient member 34 which, due to its relatively low torsional spring rate, is caused to angularly deflect. The angular deflection is fairly rapid and of significant magnitude and results in noticeable relative angular movement between the steering shaft and the input shaft, the rapid movement of the steering shaft as compared to the response of the steerable road wheels being sensed by the operator as looseness or sponginess in the steering system. Accompanying the relative angular movement between the shafts is relative movement between the circular flange 42 attached to the input shaft and the retainer 48 attached to the steering shaft, the arcuate slots 44 and 38 in circular flange 42 and plate member 33 preventing interference between the latter and the shanks of bolts 54. Since spheres 46 are only lightly captured, each rolls freely over the surface elements in a path defined by the seats 50.

Assume now, however, that nuts 56 are threaded down on bolts 54 an amount sufficient to place the spheres 46 in substantial compression between the surface elements defined by retainer 48 and circular flange 42. Under these conditions the spheres are no longer freely rollable over the surface elements but in fact exhibit a uniform resistance to rolling which is analogous to the resistance offered by a liquid to a flat surface being pulled therethrough so that, in effect, the spheres 46 uniformly retard relative movement between the surface elements just as a liquid retards movement of a plate being pulled therethrough. It will, of course, be apparent to those skilled in the art that by altering the configuration of the surface elements, as by constructing a ramp in the path of each rolling element, the compression of each sphere may be varied in response to relative angular movement between the shafts so that the rolling resistance, and hence the torsional damping, is non-uniform. Thus, when a torque is imposed upon the steering shaft when the spheres 46 are substantially compressed, the normal rapid angular deflection of the resilient member 34 and resulting relative angular movement between the shafts is viscously damped or retarded by the rolling elements so that a predetermined degree of stiffness is imparted to the coupling replacing the aforementioned sponginess. Accordingly, the shaft coupling 20 allows the desirable understeer or relative angular movement between the steering shaft and the input shaft but at a slower, virtually unnoticeable rate.

Figure 4:
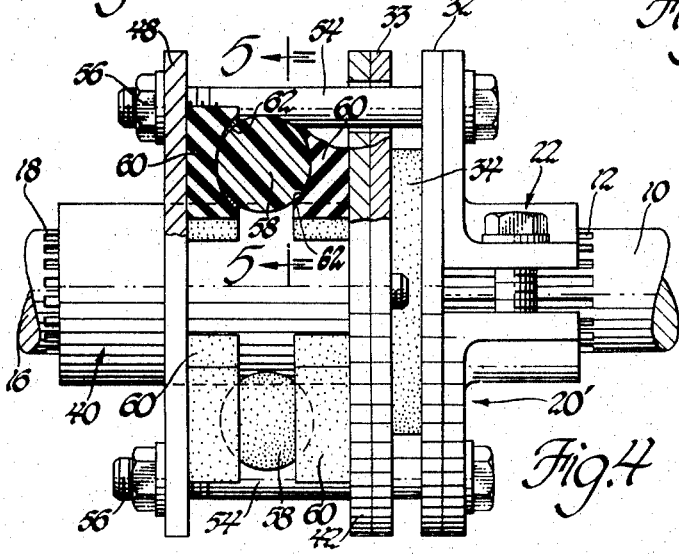
FIG. 4 is a partially broken away side elevational view of a modified embodiment of a shaft coupling according to this invention.
Figure 5:
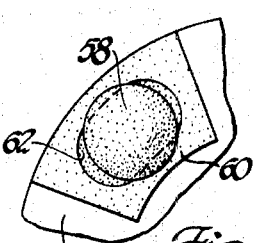
FIG. 5 is a sectional view taken generally along the plane indicated by lines 5—5 in FIG. 4.

Referring now to FIGS. 4 and 5, there is shown a modified shaft coupling 20' similar to shaft coupling 20 and having in common with the latter the split collar 22, plate members 32 and 33 with resilient member 34 therebetween, split collar 40, annular retainer 48, and bolts 54 with nuts 56 thereon. Shaft coupling 20', however, features a plurality of plastic spheres 58 captured between respective ones of a plurality of surface element segments 60. Each segment 60 is fabricated from an elastically deformable material such as rubber and has formed therein an arcuate seat 62 for reception of a respective one of the spheres 58. As in shaft coupling 20, nuts 56 are operative when threaded down on bolts 54 to tightly compress the spheres 58 between the surface elements defined by segments 60, the elastic deformation, however, occurring in the surface elements rather than in the spheres. The elastically deformed surface elements generate resistance to rolling movement of the spheres which resistance torsionally damp the resilient member 34 so that shaft couplings 20 and 20' function identically to provide the desired handling characteristics without sponginess or looseness.

Figure 6:
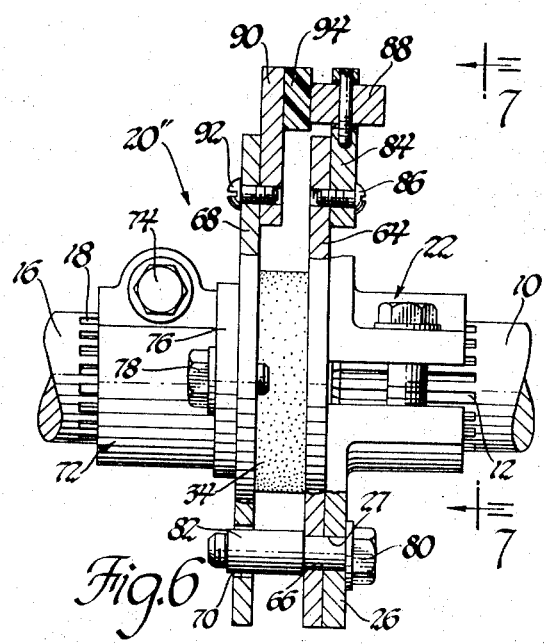
FIG. 6 is a partially broken away side elevational view of another modified embodiment of a shaft coupling according to this invention.
Figure 7:
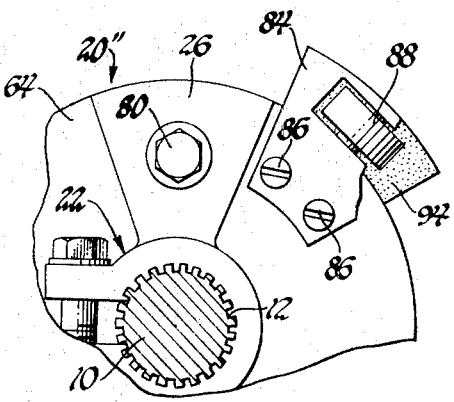
FIG. 7 is a fragmentary partially broken away sectional view taken generally along the plane indicated by lines 7—7 in FIG. 6.
Figure 8:
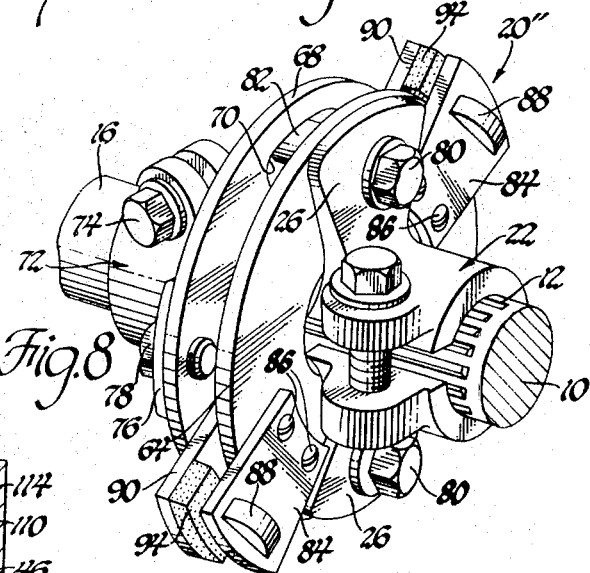
FIG. 8 is a perspective view of the shaft coupling shown in FIGS. 6 and 7.

Referring now to FIGS. 6, 7 and 8, there is shown still another modified shaft coupling 20" according to this invention having in common with shaft coupling 20 the annular resilient member 34 and the split collar 22. The shaft coupling 20" further includes a first circular plate 64 attached, as by welding, to flanges 26 of split collar 22 and having a pair of diametrically opposed apertures 66 therein registerable with apertures 27 in flanges 26. The annular resilient member 34 is bonded to the first circular plate 64 and to a second circular plate 68 having a pair of diametrically opposed arcuate slots 70 therein. The second circular plate 68 is rigidly attached by a pair of bolts to opposed flanges of a split collar 72 splined on the end of input shaft 16 and locked thereon by a bolt 74 interconnecting clamping lugs on the collar 72, only flange 76 of the split collar 72 and bolt 78 attaching circular plate 68 thereto being shown in FIGS. 6 and 8. The steering shaft 10 is thus coupled to the input shaft 16 through the resilient member 34. To prevent uncoupling of the steering shaft and input shaft in the event of failure of resilient member 34, a bolt 80 projecting through registered apertures 27 and 66 in the split collar 22 and the first circular plate 64 threadedly receives a reinforcing cylinder 82, the cylinder and bolt projecting through arcuate slot 70 in the second circular plate 68 so that if resilient member 34 fails a mechanical coupling results between the steering shaft 10 and the input shaft 16 through the split collar 22, bolt 80, second circular plate 68, bolt 78, and split collar 72.

The shaft coupling 20" further includes a pair of radially projecting roller supports 84 affixed to first circular plate 64 at diametrically opposed locations by screws 86 and rotatably supporting respective ones of a pair of rollers 88. A pair of surface element supports 90 are affixed to second circular plate 68 at diametrically opposed locations by screws 92, FIG. 6, and have rigidly affixed thereto surface element pads 94 fabricated from an elastically deformable material such as rubber. When supported on the first and second circular plates as described, the rollers 88 rollingly engage surface element pads 94. By making the supports 84 and 90 of predetermined thickness or by shimming the supports 90, substantial compression is achieved between the rollers 88 and pads 94, the latter providing substantial resistance to rolling movement of the rollers thereacross. The resistance to rolling thus achieved torsionally damps the resilient members 34 so that shaft couplings 20 and 20" function identically to provide the desired handling characteristics without sponginess or looseness.

Figure 11:
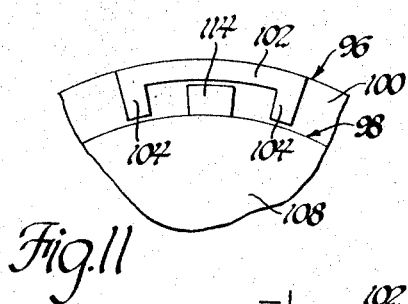
FIG. 11 is a sectional view taken generally along the plane indicated by lines 11—11 in FIG. 9.
Figure 9:
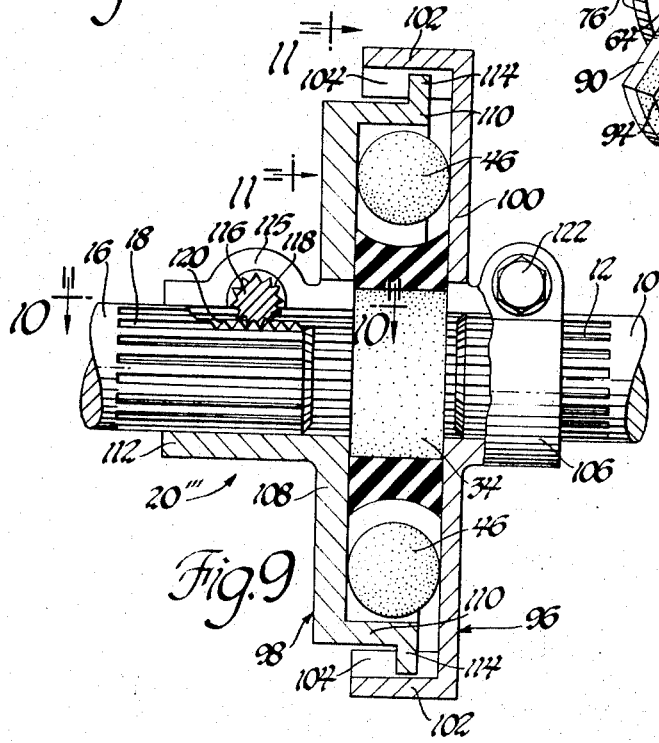
FIG. 9 is a partially broken away side elevational view of still another modified embodiment of a shaft coupling according to this invention.
Figure 10:
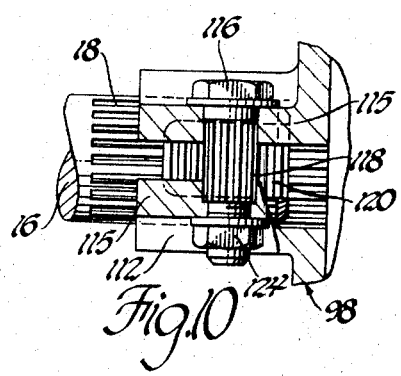
FIG. 10 is a partially broken away sectional view taken generally along the plane indicated by lines 10—10 in FIG. 9.

Referring now to FIGS. 9, 10 and 11, there is shown yet another embodiment 20''' of a shaft coupling according to this invention having in common with shaft coupling 20 the spheres 46 and resilient member 34 and including a drive member 96 and a driven member 98. The drive member 96 includes a flat circular portion 100 defining a first surface element and having integral therewith a split collar 106 and a pair of diametrically opposed keepers 102 with sides 104. The driven member 98 includes a flat circular portion 108 defining a second surface element and having integral therewith a cylindrical flange 110 and a modified split collar 112. The flange 110 has a pair of diametrically opposed pawls 114 projecting radially therefrom and the split collar 112 rotatably supports between a pair of lugs 115 a bolt 116 having axial splines 118 thereon, the splines 118 engaging a plurality of rack teeth 120 formed in the input shaft 16 adjacent the end thereof. The circular portions 100 and 108 are interconnected by resilient member 34 and the elastically deformable spheres 46 are disposed between the flange 110 and the resilient member 34 and are captured between the flat circular portions 100 and 108.

The shaft coupling 20''' is attached and locked to the steering shaft 10 by a bolt 122 extending between locking lugs on the split collar 106. The modified split collar 112 is slidably received on the splines 18 of the input shaft 16 and is adjusted axially by bolt 116 until the spheres 46 are substantially compressed between the circular plates 100 and 108 whereupon a nut 124 is threaded onto the bolt 116 to lock the split collar 112 against further movement. The compressed spheres 46 generate substantial resistance to rolling movement over the surface elements which resistance torsionally damps the resilient member 34 so that shaft couplings 20 and 20''' function identically to provide the desired handling characteristics without sponginess or looseness. If resilient member 34 fails, the pawls 114 cooperate with the sides 104 on the keepers 102 to mechanically couple the steering shaft 10 to the input shaft 16.

Having thus described the invention what is claimed is:

1. In a vehicle steering system including a manually rotatably steering shaft and a steering gear means having an input shaft, a resilient torsionally damped coupling connecting said steering shaft and said input shaft comprising, a first collar member, means rigidly attaching said first collar member to said steering shaft, a second collar member, means rigidly attaching said second collar member to said input shaft, a resilient annular connecting member, means attaching said connecting member to said first and said second collar members, said connecting member being operable to transmit power between said steering and said input shafts and elastically angularly deformable in response to the application of torque to one of said steering and said input shafts to permit relative angular movement therebetween, a retaining member, means connecting said retaining member to said first collar member for unitary rotation therewith and for axial bodily movement relative thereto, means defining a surface element on one of said second collar member and said retaining member, a spherical rolling element, means mounting said rolling element between said second collar member and said retaining member for rolling movement across said surface element in response to relative angular movement between said steering and said input shafts, one of said surface elements and said rolling element being relatively hard and the other being elastically deformable in response to substantial compressive engagement between said surface element and said rolling element, said elastic deformation generating uniform resistance to rolling movement of said rolling element across said surface element, means operative to effect substantial compressive engagement between said surface element and said rolling element so that said rolling resistance generated thereby effects torsional damping of said coupling by retarding relative angular movement between said steering shaft and said input shaft, and lost motion means between said first collar member and said second collar member operative after a predetermined amount of relative angular movement between said steering shaft and said input shaft to directly couple said first and said second collar members together for unitary rotation independently of said resilient connecting member and said rolling and said surface elements.

2. A shaft coupling as recited in claim 1 wherein said lost motion means includes abutment means, means rigidly supporting said abutment means on one of said first and said second collar members, a projecting member, and means rigidly supporting said projecting member on the other of said first and said second collar members for engagement on said abutment means after a predetermined amount of relative angular movement between said steering and said input shafts.

3. In a vehicle steering system including a manually rotatable steering shaft and a steering gear means having an input shaft, a resilient torsionally damped coupling connecting said steering shaft and said input shaft comprising, a first collar member, means rigidly attaching said first collar member to said steering shaft, a second collar member having a plurality of arcuate slots therein, means rigidly attaching said second collar member to said input shaft, a resilient annular connecting member, means attaching said connecting member to said first and said second collar members, said connecting member being operable to transmit power between said steering and said input shafts and elastically angularly deformable in response to the application of torque to one of said steering and said input shafts to permit relative angular movement therebetween, an annular retaining member having a plurality of clearance apertures therein, said retaining member being disposed about said input shaft behind said second collar member, means on opposing surfaces of said retaining member and said second collar member defining relatively hard surface elements, a plurality of bolts, means rigidly supporting each of said bolts on said first collar member for projection through respective ones of said arcuate slots in said second collar member and said clearance apertures in said retaining member, said bolts thereby supporting said retaining member on said first collar for angular movement as a unit therewith and for axial bodily movement relative thereto and to said second collar member, a plurality of spherical rolling elements disposed between said opposing surfaces of said retaining member and said second collar member for rolling movement across each of said surface elements in response to relative angular movement between said steering and said input shafts, each of said rolling elements being elastically deformable in response to compression thereof between said retaining member and said second collar member and said elastic deformation generating uniform resistance to rolling movement of said rolling elements across said surface elements, and fastener means threadedly received on respective ones of said bolts behind said retaining member and operative to effect substantial compression of said rolling elements between said retaining member and said second collar member so that the rolling resistance generated thereby damps said coupling by retarding relative angular movement between said steering and said input shafts, said bolts being engageable on the edges of respective ones of said arcuate slots after a predetermined amount of relative angular movement between said steering and said input shafts to thereby directly couple said first and said second collar members for unitary rotation independently of said resilient connecting member and said rolling and said surface elements.

* * * * *